Patented Mar. 15, 1927.

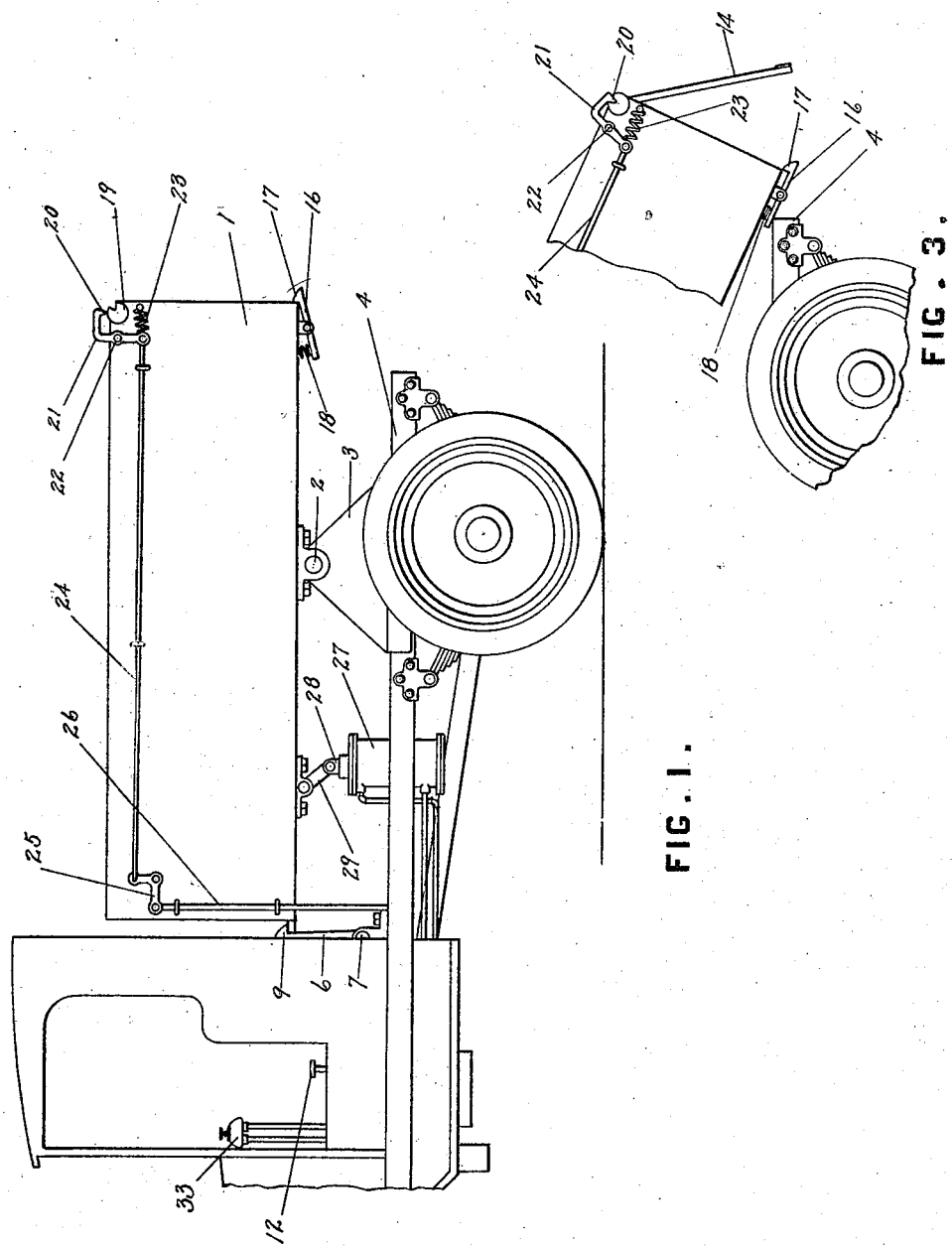

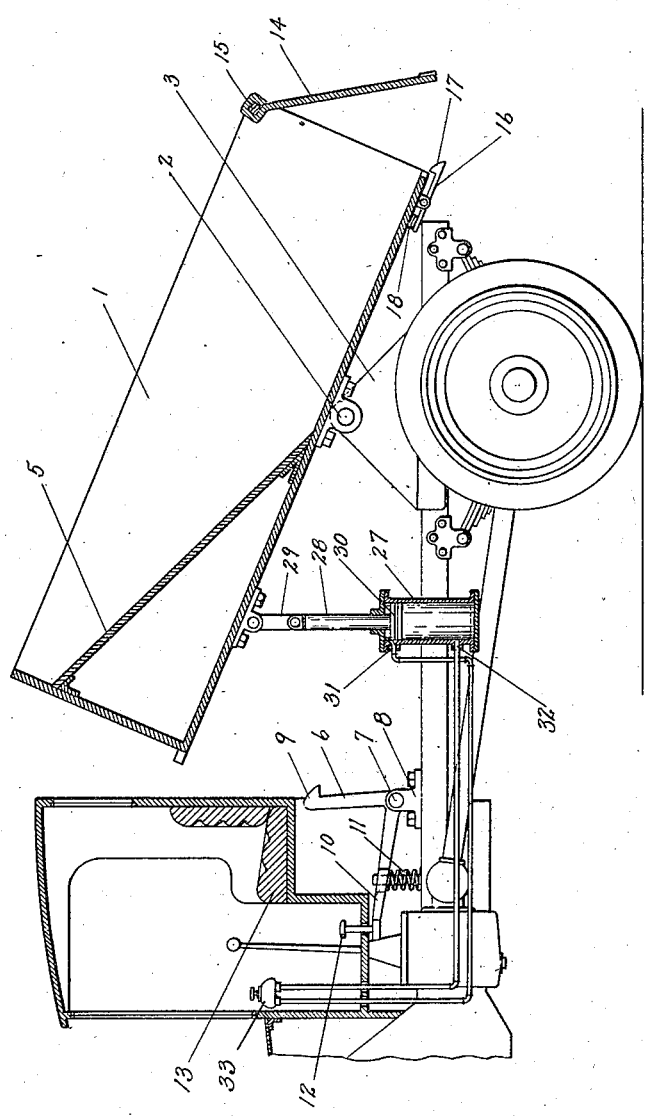

1,621,075

UNITED STATES PATENT OFFICE.

WILLIAM H. LARKIN, OF PITTSBURGH, PENNSYLVANIA.

AUTOMATIC DUMPING CAR.

Application filed January 13, 1923. Serial No. 612,469.

This invention relates to an automatic dumping car.

One object of the invention is to provide a dumping car comprising a pivoted body the weight of which is so proportioned that the body tends to swing to dumping position when carrying a load and to return to set or carrying position when the load has been dumped.

Another object of the invention is to provide such dumping car with means which automatically lock the body in set or carrying position, but which may be actuated by the driver of the car to permit swinging of the body to dumping position.

A further object of the invention is to provide means under the control of the driver of the car whereby movement of the body to either dumping or carrying position may be checked or retarded.

A still further object of the invention is to provide the body with a tail gate, and operating means therefor, so arranged that the gate is automatically locked open in dumped position of the body and locked shut in set or carrying position thereof.

In the accompanying drawings Figure 1 is a side elevation of the dumping car; Figure 2 is a vertical longitudinal section thereof; and Figure 3 is a detail elevation of the tail gate of the dumping car and the locking means therefor.

The body 1 of the car is, as shown clearly in Figures 1 and 2, pivotally mounted on a transverse rod 2 supported by webs or brackets 3 extending upwardly from the chassis 4 of the car. It will be observed from a consideration of Figure 2 of the drawings that the pivot point of the car body is to the rear of the transverse median line thereof; so that the weight of the body itself, when unloaded, causes the forward end thereof to swing downwardly into set or carrying position. It will also be observed that a portion of the space at the forward end of the body is walled off by an angularly disposed partition 5. This partition 5 is so disposed that when the body is loaded with a broken or granular substance, such as crushed rock, coal, sand, gravel, or the like, the distribution of the load more than counter-balances the superior weight of the forward portion of the body itself.

The means for retaining the body 1 of the car in set or carrying position when loaded comprises a pivoted lever 6, which is on a transverse rod 7 mounted in brackets 8. At its upper extremity this lever member 6 is provided with a hook 9 arranged to engage the forward extremity of the body 1. An operating lever 10 extends forwardly, and is normally held in position to engage hook 9 with body 1 by means of a strong helical spring 11 bearing against the under side of the lever. Operating lever 10 carries a pedal 12 which is disposed adjacent the driver's seat 13, and by means of which the operating lever 10 and lever 6 may be moved to disengage hook 9 from the forward extremity of body 1.

The tail gate 14 of the body 1 is swingingly mounted by means of a transverse rod 15 at the rear of the body. In the set or carrying position of the body (shown in Figure 1 of the drawings) this tail gate 14 is secured in closed position by means of a lever 16, which is pivotally mounted on the under side of the body adjacent the rearward extremity thereof and which has thereon a hook 17 arranged to engage the lower extremity of the gate. A coiled spring 18 bearing against one extremity of the lever yieldingly maintains the hook 17 in engagement with the gate 14. When, however, body 1 swings to dumping position, the spring 18 is compressed (as shown in Figure 3 of the drawings), and the tail gate is released.

The means for locking the gate 14 shut in set or carrying position of the body 1 comprises a locking disk 19 at one extremity of the rod 15; this locking disk being provided with a notch for receiving the tooth 20 carried by an L-shaped lever 21 pivoted at 22 to the side of the body. As the tail gate 14 swings open, tooth 20 engages in the notch in locking disk 19 to hold the gate in its open position. The tooth 20 is pressed into this engagement by means of a helical spring or the like 23, which bears against the lower extremity of lever 21. Also connected with the lower extremity of lever 21 is a rod 24, which is supported on the side of the body 1 and extends longitudinally therealong. Adjacent the forward extremity of body 1, the rod 24 is connected by means of a bell crank lever 25 with a vertical rod 26. When the body 1 of the car swings into set or carrying position, the lower extremity of rod 26 comes into contact with the chassis 4 of the car, and, acting through bell crank 25, forces the rod 24 and the lower extremity of lever 21 rearwardly against the resistance of spring 23. The tooth 20 is thus withdrawn from the notch in locking disk 19; and the tail gate 14 swings by gravity into closed position, in which it is engaged by the hook 17 on lever 16. While the lower extremity of rod 26 remains in contact with the base 4 of the car, the tooth 20 is maintained out of engagement with the notch in locking disk 19.

It will be understood that, if so desired, the means for locking the body in set or carrying position, and for locking the tail gate in open and closed position may be duplicated on the opposite sides of the car.

Means are also provided to exert a braking action on the body during its swinging movements and to place such movements under the control of the driver of the car. Such means comprises an oil cylinder 27, which is supported by the base or frame 4 of the car and having its plunger 28 connected by link 29 with the under side of the body 1. In communication with the interior of cylinder 27 on opposite sides of the piston 30 thereof are conduits 31 and 32, interconnected by way of a valve 33 which is disposed within reach of the driver of the car.

If, therefore, it is desired to dump the car when loaded, the driver depresses pedal 12 to disengage hook 9 from body 1; and operates valve 33 to permit circulation of oil through conduits 31 and 32. The weight of the load then brings the body into the dumping position shown in Figure 2 of the drawings; and the return of the body to set position during lightening of the load, and before complete discharge thereof, may be prevented by operating valve 33 to cut off the circulation of oil to and from cylinder 27, the cylinder thus acting as a locking means for the body during dumping of the load.

When the load has been completely discharged from the body 1, valve 33 is operated to again permit circulation of fluid to and from cylinder 27, and the body 1 returns of its own weight to set or carrying position in which it is engaged by the hook 9.

It will be understood that in set or carrying position of the body, as well as in dumping position thereof, the oil cylinder 27 serves as a positive lock. It thus serves to prevent undesired movement of the body when loaded to dumping position due to accidental depression of the pedal 12. It also places the rate of movement of the body 1 wholly under the control of the operator, so that as desired such movement may be either smooth and gradual or rapid and abrupt.

During operation of the body in either direction, the elements for controlling the end gate act automatically, as described above, to maintain the gate in open or closed position.

The dumping car described above presents an automatic but controlled movement of the body to and from dumping position, and provides a double lock against accidental movement in either direction. The means for retaining the load in the body of the car are also wholly automatic and are coordinated with the movement of the body itself. Both the general structure of the device and the several elements thereof are simple and relatively inexpensive.

As the device is susceptible of various modifications over the structure illustrated and described herein, the scope of the invention is to be restricted only by the limitations contained in the claims appended hereto.

What I claim is:

In a dumping car a pivoted body having the lesser weight thereof on the discharge side of the pivotal point thereof, said body being so arranged that the weight of a normal load therein overbalances the distribution of weight of the body as a whole and the distribution of weight of the body as a whole tends to return the body to carrying position when unloaded; a fluid containing cylinder having a piston, and conduits leading to said cylinder on both sides of said piston and interconnected by way of a suitable control valve, whereby the cylinder permits swinging movement of the body in accordance with the freedom of fluid circulation by way of said conduits.

In witness whereof, I hereunto set my hand.

WILLIAM H. LARKIN.